May 6, 1947.  E. H. LAND  2,420,253
OPTICAL INTERFERENCE SIGHT FOR GUNS, CAMERAS OR THE LIKE,
INCLUDING POLARIZERS AND A BIAXIAL BIREFRINGENT ELEMENT
Filed April 23, 1946  2 Sheets-Sheet 1

INVENTOR
Edwin H. Land
BY
Donald L. Brown
Attorney

May 6, 1947.   E. H. LAND   2,420,253
OPTICAL INTERFERENCE SIGHT FOR GUNS, CAMERAS OR THE LIKE, INCLUDING POLARIZERS AND A BIAXIAL BIREFRINGENT ELEMENT
Filed April 23, 1946   2 Sheets-Sheet 2
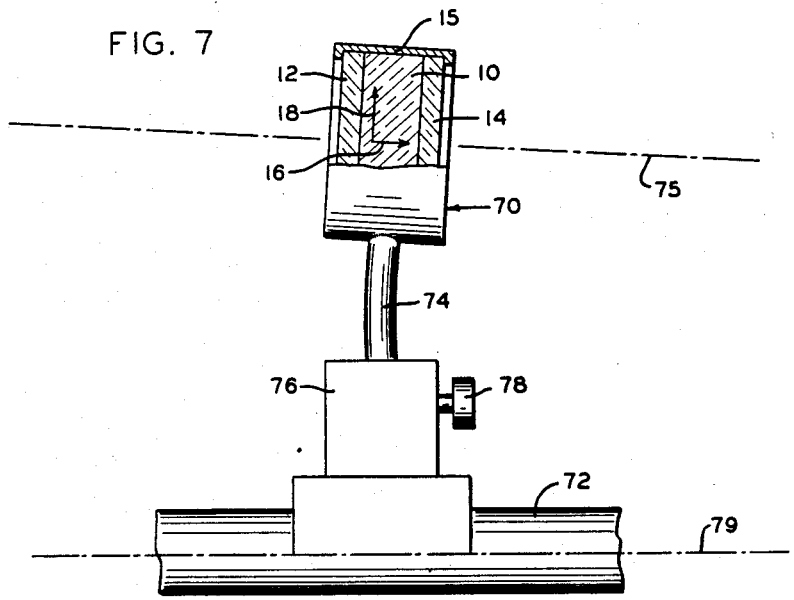
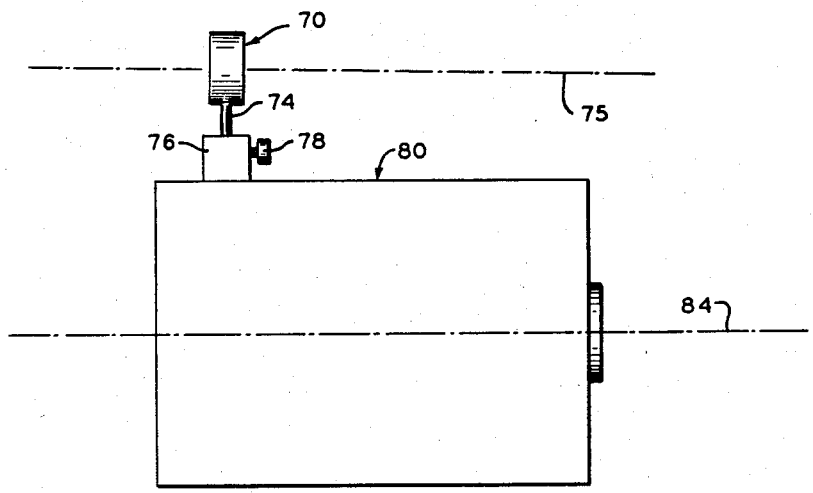
INVENTOR
Edwin H. Land
BY
Donald L. Brown
Attorney Patented May 6, 1947

2,420,253

UNITED STATES PATENT OFFICE 2,420,253

OPTICAL INTERFERENCE SIGHT FOR GUNS, CAMERAS, OR THE LIKE, INCLUDING POLARIZERS AND A BIAXIAL BIREFRINGENT ELEMENT

Edwin H. Land, Cambridge, Mass., assignor to Polaroid Corporation, Cambridge, Mass., a corporation of Delaware Application April 23, 1946, Serial No. 664,391

20 Claims. (Cl. 88—65)

1

This invention relates to sights, and more particularly to a new and improved sight for use in conjunction with firearms, cameras and the like. This application is a continuation-in-part of my applications Serial Nos. 547,023 filed July 28, 1944, and 456,181 filed August 26, 1942.

In my second-named copending application there is disclosed a new and improved sight comprising means for forming an interference pattern at optical infinity, which pattern constitutes the reticle of sight. A specific example of said sight comprises a basal section of a uniaxial crystal, such as calcite, mounted between a pair of light-polarizing elements. It is also pointed out that biaxial crystals may be used for the same purpose. The present invention is concerned with the provision of sights of the general type disclosed in my said copending application, but wherein biaxial materials are employed.

It is one object of the invention to provide a sight comprising a pair of light-polarizing elements having a biaxial birefringent element so positioned therebetween that an observer looking along one axis thereof will see an interference pattern at infinity comprising a plurality of concentric rings or portions of rings.

Another object is to provide such a sight wherein the birefringent element has its axes at such an angle to each other that the pattern visible to an observer looking along one axis is not substantially distorted by the presence of the other axis.

A further object of the invention is to provide a sight as outlined above wherein the birefringent element comprises biaxial material in which the angle between optic axes is not appreciably changed by changes in temperature.

Still further objects and advantages will in part appear and in part be pointed out in the course of the following detailed description of several embodiments of the invention, which are given as nonlimiting examples, in connection with the accompanying drawings, in which:

Figs. 4, 5 and 6 are views similar to Fig. 1 but

Figure 4:
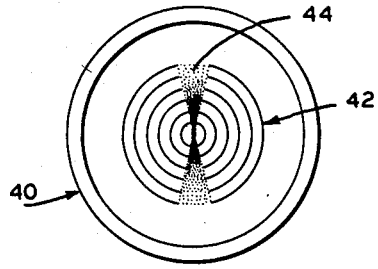
Figure 5:
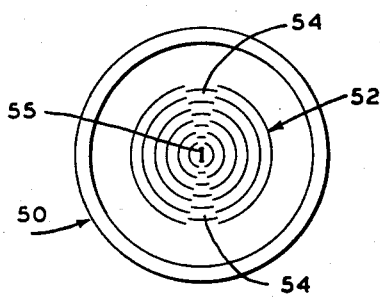
Figure 6:
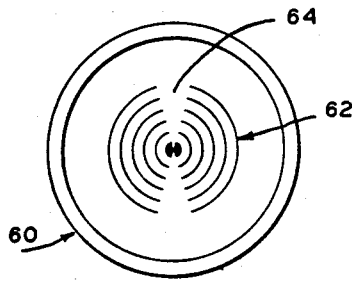

2 illustrating different patterns obtainable when linear polarizers are employed, Fig. 4 representing the case of linear polarizers with their axes substantially perpendicular, Fig. 5 showing the case of linear polarizers having their axes neither parallel nor perpendicular, and Fig. 6 showing the case of linear polarizers having their axes substantially parallel;

Fig. 7 is a diagrammatic representation of this sight and means for mounting the same in connection with firearms such, for example, as a machine gun; and Fig. 8 is a diagrammatic representation of the sight and means for mounting the same on an instrument such as a camera.

Figure 1:
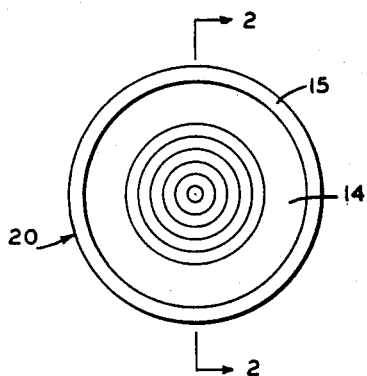
Figure 1 is an elevation showing a sight comprising an embodiment of the invention and illustrating diagrammatically the pattern visible when circular polarizers are employed of a character adapted to transmit light circularly polarized by each other.
Figure 2:
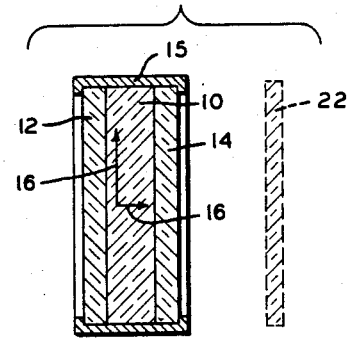
Fig. 2 is a section on the line 2—2 in Fig. 1.

In the embodiment of the invention shown in Figs. 1 and 2, element 10 comprises a section of a suitable biaxial crystal mounted between a pair of light-polarizing elements 12 and 14. It will of course be understood that all of elements 10, 12 and 14 may preferably be bonded together by any suitable adhesive means and may be provided with additional protective lamina of glass or the like, but for the sake of simplicity, specific illustration of such means is omitted from the drawings. Element 15 represents any suitable mounting rim or the like.

Arrows 16 and 18 in Fig. 2 represent the directions of the optic axes in crystal 10. It will be noted that arrow 16 is substantially perpendicular to the surfaces of crystal 10 adjacent polarizers 12 and 14. This is a preferred but not an essential condition. It is necessary only that one axis of said crystal lie in such direction that an observer may simultaneously look along said axis and through both said polarizers. In other words, axis 16 should have such relation to the faces of crystal 10 that light incident on the outer surface of either of polarizers 12 and 14 and which traverses crystal 10 parallel to said axis will be propagated in the direction of the other of said polarizers and hence will be transmitted thereby unless absorbed by the polarizing material therein. It will also be noted that arrow 18 is substantially perpendicular to arrow 16, which is a desirable but not essential condition as will be explained in greater detail hereinafter.

In Figs. 1 and 2, polarizers 12 and 14 are represented as circularly polarizing elements of the type adapted to transmit light circularly polarized by each other. It will of course be understood that in this case each of said polarizers may comprise a plane polarizing element and a quarter wave retardation element positioned between its associated polarizing element and crystal 10 with its vibration directions at angles of substantially 45° to the axis of said polarizing element. Fig. 1 illustrates the interference pattern visible to an observer looking along axis 16 of crystal 10 in this embodiment of the invention. As shown, said pattern comprises a series of concentric rings 20, colored in white light and black in monochromatic light, and it will be understood that said pattern is at optical infinity with respect to the observer. When the device is mounted as a sight, the pattern itself serves as the only reticle, with the center thereof overlying the point in the field from which light is passing directly to the eye of an observer along optic axis 16 of crystal 10. It will be understood that the device may readily be bore-sighted for use with any particular firearm or otherwise mounted—for example, as a viewfinder for a camera.

In Fig. 7 there is illustrated diagrammatically and in fragmentary fashion a sight of the present invention 70 mounted upon the barrel of a machine gun 72. In the structure shown in Fig. 7 the sight is adjustably mounted with respect to the barrel of the gun. While a fixed sight is useful, particularly in connection with machine guns employed in airplanes, where the range is usually between two hundred and six hundred yards, and hence a point-blank range, it will be apparent that where the sight is to be employed with other firearms and where longer ranges are used, the sight may preferably be adjustably mounted and thus adapted for use with varying ranges. For example, the support 74 may be slightly curved forwardly and may telescope into the base 76, so that as the range of the firearm is increased the sight 70 is elevated further above the barrel 72 and is automatically slightly inclined forward. It is thus possible to adjust the relationship of the axis 75 of the sight with respect to the axis 79 of the gun to compensate for various different conditions of use. A suitable scale, in yards, may be provided on the element 74 and means such as the set screw 78 may be provided for locking the sight in position for the desired range. It should be understood that the support 74 is not rotatable within the base 76. The effect of such a mounting would be to cause the gunner to elevate the barrel of his firearm or field piece as he centered the optical indicia apparent in the sight upon the target, thus increasing to the desired extent the range of the weapon with which the sight is associated. Various other methods of mounting the sight with respect to the firearm or field piece with which it is employed will be obvious to those skilled in the art. For example, the sight of the present invention may be incorporated with the other optical elements of a conventional telescopic sight, and may be positioned either between these elements and the eye of an observer or on the far side of the telescopic portion of such combined sight.

Fig. 8 shows the sight of the present invention 70 mounted upon an instrument such as a camera 80. A suitable base 76 to hold the support 74 of the type described in Fig. 7 may be equally provided. This adjustable mount is preferred in some cases, since it enables the axis 75 of the sight to be suitably positioned with respect to the axis 84 of the camera. Thus, for very close range work the axis of the sight may be inclined toward the axis of the camera so as to compensate for the parallax existing between these two axes. For long range work, such as outdoor views, etc., this parallax becomes negligible and the axis of the sight in this case is preferably made parallel to the axis of the camera.

There are a variety of important factors connected with the disposition of the optic axes within crystal 10. One has already been mentioned, namely, that it is desirable that the axis represented by arrow 18 be substantially perpendicular to the axis represented by arrow 16. This, however, represents an optimum condition which for practical purposes need not be attained, the more general rule being that for preferred results the angle between the two axes within crystal 10 be such that the interference pattern visible to an observer looking along one axis be free of distortion resulting from the proximity of the other axis. For example: Excellent results from this standpoint have been obtained with embodiments of the invention utilizing crystals of topaz, wherein the angle between the axes within the crystal ranges from 49° to 66°. Furthermore, even this general rule is not all-inclusive. When the two axes are so close as to cause distortion of the interference pattern, it takes the form of changing the ring shape from circular to oval, and under some conditions such a pattern may be highly desirable. An example of a material suitable for such use is a crystal of potassium nitrate, wherein the angle between the axes within the crystal is of the order of 7°, sectioned perpendicularly to the acute bisectrix.

Another important factor in the selection of biaxial materials suitable for use in the practice of the invention is the question of whether there is spectral dispersion of the optic axes or bisectrices within a given material. This is of particular importance in the case of sights intended for use in white light, since spectral dispersion within the crystal layer will cause the interference pattern to be unsymmetrical, with rings of one color or wavelength band concentric about a different center from rings of another wavelength band. A further and closely related factor is the question of whether the optic axes within a given biaxial material vary in direction with changes of temperature. It is of substantial importance that crystals wherein there is such variation be avoided in the practice of the present invention. When the sight of the invention is mounted in use, the interference pattern visible therein defines a direction of sight therethrough with respect to an optic axis of the birefringent layer. It will be apparent that if said axis may shift its direction with changes of temperature, the sight will be seriously lacking in reliability.

In general it is true that the dispersion of the optic axes in biaxial crystals is least complicated with respect to changes of either temperature or wavelength in crystals having the highest degree of symmetry, and progressively more complicated in crystals having a lower order of symmetry. It follows, therefore, that for the purpose of the present invention, satisfactory crystals are most likely to be found in the orthorhombic class. A preferred crystal from the standpoint of retaining constant axis directions with respect to both temperature and wavelength is sulfamic acid, which is admirably suited for embodiments of the invention intended for use in white light. As a specific example of the embodiment of the invention shown in Figs. 1 and 2, a pattern such as that illustrated in Fig. 1 wherein the radius of the innermost ring is a chord subtending an angle of 50 mils may be obtained by utilizing a crystal 10 of sulfamic acid of the order of 1.27 mm. in thickness and having its plane surfaces cut substantially perpendicular to the axis represented by arrow 16.

It should be expressly understood that the present invention is not limited to use in white light nor to biaxial materials showing no spectral dispersion. On the contrary, it is under many conditions practical to use crystals showing some chromatic effects, and furthermore such effects may readily be overcome by utilizing such embodiments in substantially monochromatic light. A wider selection of biaxial materials is available for such use, since the primary consideration is only that the axis direction or bisectrix for the desired wavelength band remain substantially constant for temperature changes. For example: biaxial crystals showing pronounced spectral dispersion such as orthorhombic topaz or monoclinic sucrose crystals may be embodied in a sight used in combination with a suitable color filter 22, for example a red filter, in which case the interference pattern will comprise concentric black rings or segments thereof on a red field. The thickness (d) of crystal 10 for any biaxial material and any desired size for the innermost ring may be computed from the formula $$\frac{1}{k(\sin 2V)} = d \sin i$$

wherein 2V is the angle between the optic axes within the crystal, $i$ is the angle subtended by the radius of the desired innermost ring, and $k$ is a constant derived from the formula $$\frac{\gamma - \alpha}{\lambda}$$

wherein $\gamma$ and $\alpha$ are respectively the maximum and minimum indices of refraction of the crystal and $\lambda$ is the wavelength for which the calculations are made.

The use of biaxial material as described above offers certain distinct advantages over the uniaxial material disclosed in my said co-pending application. The innermost ring 20 is smaller in the case of biaxial material than with uniaxial material of the same birefringence and thickness. Furthermore, the relative sizes and spacing of successive rings 20 are more uniform. In the case of biaxial material, the sizes of successive rings increase in accordance with the progression 1, 3, 5, 7 ... $2n-1$, wherein $n$ is the number of any ring starting with the innermost ring. On the other hand, in the case of uniaxial material the ring sizes are proportional to $\sqrt{1}, \sqrt{3}, \sqrt{5}, \sqrt{7} \ldots \sqrt{2n-1}$.

This latter characteristic is important in connection with another feature of the sights of the present invention and my said copending application. Since in said sights the pattern is at infinity, the size of the innermost ring and its relation to the other rings is a constant at all ranges. In other words, light rays from opposite ends of a diameter of any ring from any portion of the field make the same angle with each other at their point of intersection at the eye of an observer, and each of said rays makes the same angle with a normal to the face of the sight. It follows that the distance of any object whose size is known may be readily computed by its relation to the size of one or more rings, and similarly the angular speed of an object moving substantially parallel to the face of the sight may be readily computed by its progress across the field from ring to ring. A convenient size for the innermost ring is, for example, one whose radius subtends an angle of 50 mils, so that with sights using biaxial material each subsequent ring will be separated from its adjacent rings by 100 mils. On the other hand, in sights using uniaxial material, the radius of any outer ring will be equal to the square root of the ring number multiplied by the radius of the innermost ring. It will accordingly be seen that the above computations of object distance or speed will be substantially less complicated in the case of biaxial material.

Figure 3:
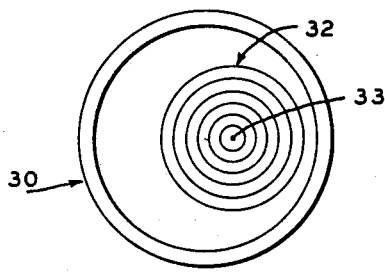
Fig. 3 is a view similar to Fig. 1 but illustrating the pattern visible when circular polarizers are employed of a character adapted to block light circularly polarized by each other.

Another advantage deriving from the use of biaxial material in the sights of the invention is illustrated in Fig. 3, which represents the interference pattern obtained in a sight 30 similar to that shown in Figs. 1 and 2, but employing unlike circular polarizers, i. e., polarizers adapted to block light circularly polarized by each other. As shown in Fig. 3, said pattern comprises a series of concentric rings 32 similar to rings 20 in Fig. 1 but having a dark center dot 33 as opposed to the open center of the pattern in Fig. 1. A similar pattern may be produced using uniaxial material in accordance with my said co-pending application, but with biaxial material dot 33 is substantially smaller than in the case of uniaxial material giving the same sized innermost ring. The relative sizes and spacing of successive rings 32 differ slightly from the case shown in Fig. 1 in that the increase of ring sizes follows the progression 1, 2, 3, 4, 5 ... $n$. In the corresponding case with uniaxial material the progression is $\sqrt{1}, \sqrt{2}, \sqrt{3}, \sqrt{4} \ldots \sqrt{n}$. It should be noted that in each of the embodiments illustrated in Figs. 1–3, it is preferred that the quarter-wave elements be crossed with each other in order to eliminate unsymmetrical chromatic effects. With this arrangement, the linear polarizing elements in the embodiment illustrated in Fig. 1 will preferably have their axes parallel, and in Fig. 3, the polarizing elements will have their respective axes at right angles to each other.

Fig. 3 also illustrates an exceedingly important advantage common to the products of the present invention as well as those of my said co-pending application using uniaxial material. This is that an observer using one of said sights is not limited to a single eye position as in the case of conventional sights. A line from the eye of an observer to the center of dot 33 will always make the same angle with the face of sight 30, and the same is true of a line from an observer's eye to the center of rings 20 in Fig. 1. It follows, therefore, that if the observer's eye moves laterally, dot 33 and rings 32 will similarly appear to move with respect to the surface of sight 30, as is indicated in Fig. 3 by showing the ring pattern offset with respect to the center of the device. However, since said pattern is at optical infinity, the motion of dot 33 with respect to the field will be negligible and cannot exceed its apparent motion with respect to the face of the sight. In other words, if the diameter of the sight is, for example, two inches, the apparent motion of dot 33 with respect to the sight and field resulting from motion of the observer's eye will be approximately two inches, an amount obviously too small to require any consideration in aiming. To state the matter from another aspect, a line from the observer's eye to that point in the field directly coinciding with the center of dot 33, or with the center of circles 20 in Fig. 1, will always traverse the birefringent material in the sight along an optic axis thereof and will always make the same angle with the surface of said sight. Furthermore, since as pointed out above said birefringent material will preferably have an optic axis substantially perpendicular to its surfaces, said line will in the preferred embodiment of the invention coincide with a normal from the observer's eye to the surface of the sight.

Figs. 4, 5 and 6 illustrate interference patterns obtainable with embodiments of the invention utilizing linear polarizing elements instead of circular polarizers. If in Fig. 2 polarizers 12 and 14 comprise linear polarizing elements having their polarizing axes substantially perpendicular, the resulting pattern will be as illustrated by sight 40 in Fig. 4. Said pattern comprises a series of concentric partial rings 42 separated by a substantially dark band 44 passing through the center of the pattern and tapering somewhat in width from its outer ends towards the middle thereof. Fig. 6 illustrates the converse of Fig. 4, namely the pattern obtained in a sight 60 employing linear polarizers having their axes relatively parallel. Instead of dark band 44, as in Fig. 4, partial concentric rings 62 are separated by a clear band 64. Fig. 5 represents a pattern intermediate those shown in Figs. 4 and 6 and obtained by employing in sight 50 linear polarizers having their polarizing axes neither parallel nor perpendicular to each other. Partial concentric rings 52 are separated in part by another series of partial concentric rings 54 of different radii and by a partial dark band 55 at the center of the pattern similar to band 44 in Fig. 4. The density of partial rings 54 depends on the angle between the axes of the polarizing elements employed in sight 50, and it may accordingly be varied between the substantially black color of band 44 in Fig. 4 to the substantially complete transparency of band 64 in Fig. 6.

Sights of the type illustrated in Figs. 4–6 and using biaxial material differ in a number of respects from similar sights employing linear polarizers and uniaxial material as disclosed in my said co-pending application. They possess the same advantages with respect to the sizes and spacing of the rings as have already been discussed in connection with the sights illustrated in Figs. 1 and 3. In addition, the interference patterns obtainable therewith differ from the patterns obtained in corresponding manner with uniaxial material in that the latter include a pair of crossed bands instead of the single bands 44, 54 and 64 shown in Figs. 4–6. The limitations on the manner of combining biaxial material with linear polarizers are the same as have already been discussed hereinabove in connection with circularly polarizing elements.

Since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having an optic axis and being of such birefringence and being so positioned between said polarizing elements as to form an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

2. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

3. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having an optic axis substantially perpendicular to the adjacent surfaces of said polarizing elements and being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

4. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having an optic axis thereof substantially perpendicular to said surfaces, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

5. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having the acute bisectrix thereof substantially perpendicular to said surfaces, said birefringent element being of such birefringence and thickness as to produce an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

6. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, the other axis of said birefringent element being disposed at such an angle to said first-named axis as to produce substantially minimum distortion of said interference pattern, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship wtih said instrument axis, whereby said indicia bear a predetermined relationship with respect to said instrument axis.

7. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, the other axis of said birefringent element being disposed at such an angle to said first-named axis as to produce substantially minimum distortion of said interference pattern, said birefringent element comprising material wherein the relative positions of the optic axes therein is not substantially changed by changes of temperature, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

8. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having an optic axis thereof substantially perpendicular to said surfaces, said birefringent element being of such thickness and birefringence as to produce an interference pattern at optical infinity visible to an observer looking through said viewing area along said axis, the other axis of said birefringent element being disposed at such an angle to said first-named axis as to produce substantially minimum distortion of said interference pattern, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

9. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having an optic axis thereof substantially perpendicular to said surfaces, said birefringent element being of such thickness and birefringence as to produce an interference pattern at optical infinity visible to an observer looking through said viewing area along said axis, the other axis of said birefringent element being disposed at such an angle to said first-named axis as to produce substantially minimum distortion of said interference pattern, said birefringent element comprising material wherein the relative positions of the optic axes therein is not substantially changed by changes of temperature, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

10. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having an optic axis thereof substantially perpendicular to said surfaces, said birefringent element being of such thickness and birefringence as to produce an interference pattern at optical infinity visible to an observer looking through said viewing area along said axis, said birefringent element comprising material wherein the direction of said axis is substantially constant for substantially all wavelengths of visible light, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

11. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing elements substantially parallel and having the acute bisectrix thereof substantially perpendicular to said surfaces, said birefringent element being of such birefringence and thickness as to produce an interference pattern at optical infinity visible to an observer looking through said viewing area, said birefringent element comprising material wherein the direction of said bisectrix is substantially constant for substantially all wavelengths of visible light, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

12. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing element substantially perpendicular to an optic axis therein, said birefringent element comprising sulfamic acid and being of such thickness as to produce an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

13. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing element substantially perpendicular to an optic axis therein, said birefringent element comprising topaz and being of such thickness as to produce an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

14. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having its surfaces adjacent said polarizing element substantially perpendicular to an optic axis therein, said birefringent element comprising sucrose and being of such thickness as to produce an interference pattern at optical infinity visible to an observer looking through said viewing area, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

15. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, color filter means positioned in the line of sight through said viewing area, said filter means transmitting only light of a predetermined wavelength band, said birefringent element comprising material wherein the direction of said optic axis is substantially constant for light of said wavelength band, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

16. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, each of said polarizing elements being positioned to transmit light polarized by the other of said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

17. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, each of said polarizing elements being positioned to block light polarized by the other of said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

18. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, each of said polarizing elements being adapted to circularly polarize light transmitted thereby in the direction of the other of said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

19. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, each of said polarizing elements being adapted to circularly polarize light transmitted thereby in the direction of the other of said polarizing elements, each of said polarizing elements being positioned to transmit light polarized by the other of said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

20. In combination with an instrument such as a gun, camera or the like having an axis which determines the direction of operation of said instrument, sighting means comprising, in combination, means providing a transparent viewing area, a plurality of light polarizing elements positioned in superimposed relation within the line of sight through said viewing area, said second-named means additionally including a support for said elements, and a biaxial birefringent element positioned between said polarizing elements, each of said polarizing elements being adapted to circularly polarize light transmitted thereby in the direction of the other of said polarizing elements, each of said polarizing elements being positioned to block light polarized by the other of said polarizing elements, said birefringent element having an optic axis so disposed therein that light incident on one of said polarizing elements and traversing said birefringent element in a direction parallel to said optic axis will be propagated in the direction of the second of said polarizing elements, said birefringent element being of such thickness and birefringence as to produce an interference pattern at optical infinity visible to an observer looking through said viewing area along said axis, said birefringent and polarizing elements producing a central interference indicium appearing concentric with said optic axis at optical infinity and serving as a reticle for said sighting means, said elements also producing a predetermined series of other indicia appearing at optical infinity and being predeterminedly angularly related to said optic axis, and means for mounting said support on said instrument so that said optic axis bears a predetermined relationship with said instrument axis, whereby said indicia bear a predetermined relationship with respect to said instrument axis.

EDWIN H. LAND.